3,056,770
POLYMERIZATION PROCESS
Gaetano F. D'Alelio, South Bend, Ind., assignor, by direct and mesne assignments, to Dal Mon Research Co., Cleveland, Ohio, a corporation of Delaware
No Drawing. Filed Mar. 4, 1958, Ser. No. 718,948
23 Claims. (Cl. 260—94.3)

This invention is concerned with the polymerization of olefins such as ethylene, propylene, butene-1, styrene, butadiene, isoprene and the like olefins in an inert solvent in the presence of a catalyst prepared by reacting a mixture consisting essentially of an aluminum halide, for example, aluminum chloride and at least one metal selected from the group consisting of cerium and hafnium.

Friedel-Crafts type catalysts are not effective in converting ethylene to high molecular weight solid polymers but they do produce liquid or low molecular weight polymers. More recently it has been reported that mixture of solid polymers and liquid polymers may be obtained by polymerizing ethylene in the presence of a mixture of aluminum chloride and titanium tetrachloride at high pressures and elevated temperatures, preferably in the presence of metals which bind the hydrogen chloride released from the titanium tetrachloride. The Friedel-Crafts catalysts are even less effective in converting olefins such as propylene, butene-1, pentene-1, hexene-1, etc., vinyl cyclohexane, vinyl cyclohexene, butadiene, 2-methyl-butadiene-1,3 etc. or in general monomers having a $CH_2=CH-$ or a $CH_2=C<$ structure, to high molecular weight solid or rubbery polymers. The catalysts of this invention are effective polymerization catalysts for such olefins and related olefins.

I have now discovered that $AlCl_3$ may be used to produce high molecular weight solid polymers of ethylene and of other olefins if the aluminum chloride is first reacted with a metal selected from the group of cerium and hafnium. The reaction between the aluminum chloride and the metal may be effected in any suitable manner. Preferably the metal should be in a finely divided form and mixed with the aluminum chloride. This mixture may be ground or milled together for a suitable time to produce an active polymerization catalyst for olefins. Also they may be heated together at temperatures above room temperature and preferably at temperatures between 200–400° C. to produce a catalyst suitable for the polymerization of olefins. The catalyst prepared by heating the metal and the aluminum chloride may be ground or ball-milled after heating to increase the activity of the catalyst. The nature of the catalysts of this invention is unknown but they appear to be compounds that contain reactive and unstable metal to metal bonds; for example, the reaction product of one mole of cerium with one mole of aluminum chloride behaves as if it were

$Cl_2Al.CeCl$ and is pyrophoric and extremely reactive with water, alcohols, ketones and the like.

I do not wish to be bound by this theory because of the complex nature of the reaction, but it may be readily observed that a reaction does occur between the free metal and the aluminum chloride since part or all of the metal loses its identity during the reaction. Instead of aluminum chloride, an aluminum halide such as the fluoride, bromide, or iodide may be used. For economic reasons, the chloride is preferred.

The catalysts of this invention are extremely reactive and sensitive to contaminants such as moisture, oxygen and the like, and therefore should be processed under inert conditions such as in the presence of nitrogen, or the noble gases such as helium, neon, argon, etc. They are also strong reducing agents and are easily oxidized.

The grinding and milling operations may be performed as a dry operation in the absence of an inert hydrocarbon. Sometimes it is more convenient to wet grind the mixture of the metal and the aluminum halide by adding an inert hydrocarbon to the mixture to be ground or ball-milled. The hydrocarbon, if used, is preferably one that will not interfere with the subsequent polymerization reaction and is preferably the same hydrocarbon used in the polymerization reaction. Also the mililng or grinding can be carried out partly by dry grinding in an inert atmosphere and then an inert hydrocarbon added to the mill toward the end of the milling in order to slurry the product for ease of handling.

The ratio of the metal to the aluminum halide that may be used in the preparation of the catalysts of this invention is not critical, e.g. between 1 part metal to 100 parts $AlCl_3$ to 100 parts metal to 1 part $AlCl_3$. Particularly satisfactory results are obtained in the ranges of from 1 part of metal to 3 parts of aluminum chloride to 3 parts of the metal to one part aluminum chloride. It has also been found that the nature of the catalyst resulting from the ratio of metal to the aluminum halide determines the nature of the polymer obtained. If large amounts of aluminum chloride are used, or if the reaction between the metal and the aluminum chloride leaves large amounts of aluminum chloride in the catalyst mixture lower molecular weight polymers are obtained than if lesser amounts are present. In such cases, and if desired, the excess aluminum chloride may be removed from the catalyst mixture by subliming the chloride by heating the mixture or by passing an inert gas such as helium or a noble gas through the heated catalyst, or by selective extraction with an aromatic hydrocarbon such as benzene, toluene or xylene, etc.

As a polymerization medium substantially any inert material may be used which is liquid under the conditions of temperature and pressure employed and which has a solvent action in the olefin polymerized. Hydrocarbon solvents are preferred and are preferably free substantially of materials that react with the catalyst such as $O_2$, $H_2O$, alcohols, ktones and the like. Suitable solvents include pentane, hexane, cyclohexane, octane, benzene, toluene, xylene and the like. The aromatic hydrocarbons are preferred. In some cases, the monomer or mixtures of monomers, if liquid, may be used as a polymerization medium, for example, such as styrene, isoprene, 2,3-dimethyl-butadiene-1,3, vinylcyclohexene, etc.

The amount of catalyst is not critical. Relatively small amounts are operable to form relatively large amounts of polymer. In general, a practical range is 0.001 to 0.1 mole catalyst per mole of olefin polymerized. Even larger amounts of catalysts are operable but are uneconomical and make the polymer more difficult to purify. When low molecular weight polymers are obtained by the process of this invention, they are useful as chemical intermediates in alkylation, epoxidation, chlorination, sulfonation, etc., and as plasticizers for the solid polymers produced by the procedures described herein.

The catalysts as prepared in the practice of this invention are useful in polymerizing olefins at temperatures ranging from about room temperature up to 200° C. or even higher and at pressures ranging from atmospheric or a few atmospheres to pressures as high as 10,000 p.s.i. or higher. For practical operations temperatures in the range of 70–200° C. and pressures of 100–2000 p.s.i. are suitable. The following examples illustrate without limiting the invention.

*Example I*

Ten grams of finely ground cerium and 1 gram of $AlCl_3$ are ground in an atmosphere of pure nitrogen for 200–300 hours in a conventional stainless steel ball-mill of about 4 ounce capacity about ½ full of ½ inch stainless steel balls. Five grams of the resulting catalyst are suspended in 50 moles of toluene in a 200 mole stainless steel, stirred autoclave. The transfer from the mill to the autoclave is made in a dry box under a slight pressure of nitrogen to avoid contamination with moisture and oxygen. After the catalyst is transferred, the autoclave is sealed and pressured with ethylene to about 500 p.s.i. and heated to a temperature of about 150° C. During the polymerization reaction frequent repressuring with ethylene is necessary. At the end of 16 hours, the polymerization is stopped even though ethylene is still being absorbed. The reactor is cooled, vented and opened and the crude polyethylene transferred to a container containing 500 moles of methanol acidified with HCl and refluxed for 2 hours. The purified solid white polyethylene is separated by filtration and dried and weighs about 83 grams.

If instead of cerium, hafnium or a mixture of hafnium and cerium is used in the above reaction with $AlCl_3$ a catalyst, similar in polymerization performance to the catalyst produced from cerium and $AlCl_3$ is obtained.

*Example II*

An electrically heated vertical furnace made of a quartz tube 10 inches long and ¾ inches I.D. wrapped with electrically heating resistance wire is filled with a mixture of 5 grams of hafnium and ten grams of aluminum chloride and the gas in the tube replaced by helium to give an inert atmosphere. The furnace is then heated to about 300° C. for 12–24 hours. Any aluminum chloride that sublimes from the reaction mixture may be returned to the reaction or may be replaced by new aluminum chloride by passing a heated inert gas such as helium or a noble gas through heated aluminum chloride and passing this gas through the tube. Alternately the hafnium and the $AlCl_3$ may be sealed in the quartz tube and the sealed tube heated. The reaction product may be used directly as in Example I to give an excellent yield of high molecular weight, high density polyethylenes. As an alternate procedure, the catalyst of this example may be freed of excess aluminum chloride by passing an inert gas through the heated quartz tube until aluminum chloride ceases to sublime from the mixture. The activity of the catalyst can be increased by balling the catalyst prepared by heating the metal and the aluminum chloride. The cooled catalyst is transferred in an inert medium and ground in a ball mill according to the procedure of Example I for 72 hours. This ground catalyst is used to polymerize ethylene at temperatures between 70–100° C. and at pressures between 250–500 p.s.i.

*Example III*

The catalyst of Example II is washed with toluene to remove nearly all residual $AlCl_3$ and placed in a 200 ml. capacity stainless steel rocking autoclave containing 50 ml. heptane. The autoclave is connected to a source of propylene, sealed and heated to a reaction temperature of 75° C. The propylene pressure is initially 160–175 p.s.i. and from time to time over a period of 24–36 hours is repressured with propylene as the polymerization proceeds. At the end of the reaction, the autoclave is cooled, vented, and the reaction mixture transferred to a container containing 200 ml. of methanol acidified with HCl and boiled for 30 minutes. The purified solid polypropylene is then removed by filtration and dried; yield 45 grams. Substitution of the propylene by butene-1, hexene-1, octene-1, vinylcyclohexane and vinylcyclohexene produce the corresponding polymers, whereas mixtures of these monomers produce copolymers.

*Example IV*

Catalysts similar to those of Example I and Example II may also be prepared by reacting the metal and the aluminum chloride in the stainless steel ball mill of Example I heated electrically to 400° C., thereby combining heating and grinding operations in one step to produce active catalysts suitable for polymerizing a wide range of olefins.

*Example V*

Catalysts suitable for olefin preparation are also readily prepared by reacting the metal with the aluminum halide, as for example aluminum chloride, aluminum iodide, etc., in an inert liquid medium. Two grams of finely ground cerium and 5 grams of aluminum chloride in 50 moles of benzene, or toluene or chlorobenzene are refluxed in an inert atmosphere for 300 hours. The reaction mixture is transferred to an autoclave as in Example I and a similar high yield of high polymer is obtained.

The catalysts of this invention are very reactive ionic catalysts and pyrophoric. Surprisingly they also form complexes with organometal compounds such as for example the metal alkyls, e.g., phenyllithium, butyllithium, cyclohexyllithium, lithium aluminum tetrabutyl, Grignard reagents, etc. These complexes are active olefin catalysts especially useful in the production of cis polymers of isoprene, butadiene and other conjugated dienes and diolefins.

*Example VI*

Under inert conditions, there is added to 5 grams of the catalyst of Example II dispersed in 20 ml. of hexane, 2 grams of butyl lithium in 10 ml. of hexane, and to this mixture there is added 50 grams of isoprene with 200 grams of hexane and the mixture maintained at room temperature to 50° C. for 24 hours, after which 500 ml. of methanol is added to the polymer dispersion and refluxed for about ½ hour. The solvent is decanted from the polymer and vacuum dried. Yield of rubbery polymer, 44.6 grams.

When styrene is used with the catalyst of this example a fibrous polystyrene is obtained, and mixtures of styrene or other vinyl aryls with dienes or diolefins such as butadiene or isoprene, clear high impact copolymers are obtained.

The homopolymer- and copolymer-polyolefins obtained by the practice of this invention may be used in any conventional manner now being used by polyolefins formed by prior art procedures. These polyolefins may be used to make molding, film, filaments, pipe, tubing, tires, inner tubes, etc., using the same equipment and techniques customary for such polyolefins.

I claim:

1. The method of polymerizing to a solid polymer an alpha olefin having no less than 2 carbon atoms and no more than 8 carbon atoms per molecule that comprises reacting said olefin in an inert solvent containing a catalyst comprising the preformed aluminum halide-metal reaction product obtained by reacting under inert conditions and at a temperature in the range of from room temperature to about 400° C. a mixture consisting essentially of an aluminum halide and a metal selected from the group consisting of cerium and hafnium, said mixture containing 0.01–100 parts by weight of said aluminum halide per part by weight of said metal.

2. The method of polymerizing to a solid polymer an alpha olefin having no less than 2 carbon atoms and no more than 8 carbon atoms per molecule that comprises reacting said olefin in an inert solvent containing a catalyst comprising the preformed aluminum halide-metal reaction product obtained by reacting under inert conditions and at a temperature in the range of from room temperature to about 400° C. a mixture consisting essentially of an aluminum halide and a metal selected from the group consisting of cerium and hafnium, said mixture containing 0.01–100 parts by weight of said aluminum halide per part by weight of said metal, and said catalyst being complexed with a metalalkyl selected from the class consisting of phenyllithium, butyllithium, cyclohexyllithium, lithium aluminum tetrabutyl, and Grignard reagents.

3. The method of polymerizing to a solid polymer an alpha olefin having no less than 2 carbon atoms and no more than 8 carbon atoms per molecule that comprises reacting said olefin in an inert solvent containing a catalyst comprising the aluminum halide-metal reaction product obtained by heating under inert conditions and at a temperature in the range of from about 200° C. to about 400° C. a mixture consisting essentially of an aluminum halide and a metal selected from the group consisting of cerium and hafnium, said mixture containing 0.01–100 parts by weight of said aluminum halide per part by weight of said metal.

4. The method of polymerizing to a solid polymer an alpha olefin having no less than 2 carbon atoms and no more than 8 carbon atoms per molecule that comprises reacting said olefin in an inert solvent containing a catalyst comprising the aluminum chloride-metal reaction product prepared by heating under inert conditions and at a temperature in the range of from about 200° C. to about 400° C. a mixture consisting essentially of an aluminum chloride and a metal selected from the group consisting of cerium and hafnium, said mixture containing 0.01–100 parts by weight of said aluminum chloride per part by weight of said metal.

5. The method of polymerizing to a solid polymer an alpha olefin having no less than 2 carbon atoms and no more than 8 carbon atoms per molecule that comprises reacting said olefin in an inert solvent containing a catalyst comprising the aluminum halide-metal reaction product obtained by grinding under inert conditions and at a temperature in the range of from room temperature to about 400° C. a mixture consisting essentially of an aluminum halide and a metal selected from the group consisting of cerium and hafnium, said mixture containing 0.01–100 parts by weight of said aluminum halide per part by weight of said metal.

6. The method of polymerizing to a solid polymer an alpha olefin having no less than 2 carbon atoms and no more than 8 carbon atoms per molecule that comprises reacting said olefin in an inert solvent containing a catalyst comprising the aluminum chloride-metal reaction product prepared by grinding under inert conditions and at a temperature in the range of from room temperature to about 400° C. a mixture consisting essentially of an aluminum chloride and a metal selected from the group consisting of cerium and hafnium, said mixture containing 0.01–100 parts by weight of said aluminum chloride per part by weight of said metal.

7. The method of polymerizing to a solid polymer an alpha olefin having no less than 2 carbon atoms and no more than 8 carbon atoms per molecule that comprises reacting said olefin in an inert solvent containing a catalyst comprising the aluminum chloride-metal reaction product prepared by heating under inert conditions and at a temperature in the range of from about 200° C. to about 400° C. a mixture consisting essentially of an aluminum chloride and a metal selected from the group consisting of cerium and hafnium, said mixture containing 0.33 part to 3 parts by weight of said aluminum chloride per part by weight of said metal, and said catalyst being complexed with a metalalkyl selected from the class consisting of phenyllithium, butyllithium, cyclohexyllithium, lithium aluminum tetrabutyl, and Grignard reagents.

8. The method of polymerizing to a solid polymer an alpha olefin having no less than 2 carbon atoms and no more than 8 carbon atoms per molecule that comprises reacting said olefin in an inert solvent containing a catalyst comprising the aluminum chloride-metal reaction product prepared by grinding under inert conditions and at a temperature in the range of from room temperature to about 400° C. a mixture consisting essentially of an aluminum chloride and a metal selected from the group consisting of cerium and hafnium, said mixture containing 0.33 part to 3 parts by weight of said aluminum chloride per part by weight of said metal, and said catalyst being complexed with a metalalkyl selected from the class consisting of phenyllithium, butyllithium, cyclohexyllithium, lithium aluminum tetrabutyl, and Grignard reagents.

9. The method of polymerizing to a solid polymer an alpha monoolefin having no less than 2 carbon atoms and no more than 8 carbon atoms per molecule that comprises reacting said monoolefin in an inert solvent containing a catalyst comprising the preformed aluminum chloride-metal reaction product prepared by reacting under inert conditions and at a temperature in the range of from room temperature to about 400° C. a mixture consisting essentially of an aluminum chloride and a metal selected from the group consisting of cerium and hafnium, said mixture containing 0.33 part to 3 parts by weight of said aluminum halide per part by weight of said metal.

10. The method of polymerizing to a solid polymer a diolefin having no less than 4 carbon atoms and no more than 8 carbon atoms per molecule that comprises reacting said diolefin in an inert solvent containing a catalyst comprising the preformed aluminum chloride-metal reaction product prepared by reacting under inert conditions and at a temperature in the range of from room temperature to about 400° C. a mixture consisting essentially of an aluminum chloride and a metal selected from the group consisting of cerium and hafnium, said mixture containing 0.33 part to 3 parts by weight of said aluminum halide per part by weight of said metal.

11. The method of polymerizing ethylene to a solid polymer which comprises heating ethylene in a hydrocarbon solvent at a temperature of about room temperature to 200° C. and at a pressure of about atmospheric pressure to 2000 p.s.i., said solvent containing a catalyst comprising the aluminum chloride-metal reaction product prepared by heating and grinding a mixture consisting essentially of aluminum chloride and a metal selected from the class consisting of cerium and hafnium, said mixture containing 0.33 part to 3 parts by weight of said aluminum halide per part by weight of said metal.

12. The method of polymerizing propylene to a solid polymer which comprises heating propylene in a hydrocarbon solvent at a temperature of about room temperature to 200° C. and at a pressure of about atmospheric pressure to 2000 p.s.i., said solvent containing a catalyst comprising the aluminum chloride-metal reaction product prepared by grinding at a temperature in the range of from room temperature to about 400° C. a mixture consisting essentially of aluminum chloride and a metal selected from the class consisting of cerium and hafnium, said mixture containing 0.33 part to 3 parts by weight of said aluminum halide per part by weight of said metal.

13. The method of polymerizing isoprene to a solid polymer which comprises heating isoprene in a hydrocarbon solvent at a temperature of about room temperature to 200° C. and at a pressure of about atmospheric pressure to 2000 p.s.i., said solvent containing a catalyst comprising the aluminum chloride-metal reaction product prepared by grinding at a temperature in the range of from room temperature to about 400° C. a mixture consisting essentially of aluminum chloride and a metal selected from the class consisting of cerium and hafnium, said mixture containing 0.33 part to 3 parts by weight of said aluminum halide per part by weight of said metal.

14. The method of polymerizing ethylene to a solid polymer which comprises heating ethylene in a hydrocarbon solvent at a temperature of about room temperature to 200° C. and at a pressure of about atmospheric pressure to 2000 p.s.i., said solvent containing a catalyst comprising the aluminum chloride-metal reaction product prepared by grinding at a temperature in the range of from room temperature to about 400° C. a mixture consisting essentially of aluminum chloride and a metal selected from the class consisting of cerium and hafnium, said mixture containing 0.33 part to 3 parts by weight of said aluminum chloride per part by weight of said metal, and said catalyst being complexed with butyllithium.

15. The method of polymerizing propylene to a solid polymer which comprises heating propylene in a hydrocarbon solvent at a temperature of about room temperature to 200° C. and at a pressure of about atmospheric pressure to 2000 p.s.i., said solvent containing a catalyst comprising the aluminum chloride-metal reaction product prepared by grinding at a temperature in the range of from room temperature to about 400° C. a mixture consisting essentially of aluminum chloride and a metal selected from the class consisting of cerium and hafnium, said mixture containing 0.33 part to 3 parts by weight of said aluminum chloride per part by weight of said metal, and said catalyst being complexed with butyllithium.

16. The method of polymerizing isoprene to a solid polymer, which comprises heating isoprene in a hydrocarbon solvent at a temperature of about room temperature to 200° C. and at a pressure of about atmospheric pressure to 2000 p.s.i., said solvent containing a catalyst comprising the aluminum chloride-metal reaction product prepared by grinding at a temperature in the range of from room temperature to about 400° C. a mixture consisting essentially of aluminum chloride and a metal selected from the class consisting of cerium and hafnium, said mixture containing 0.33 part to 3 parts by weight of said aluminum chloride per part by weight of said metal, and said catalyst being complexed with butyllithium.

17. A polymerization catalyst comprising the aluminum halide-metal reaction product obtained by the step of reacting in the absence of olefin under inert conditions and at a temperature in the range of from room temperature to about 400° C. a mixture consisting essentially of an aluminum halide and a metal selected from the group consisting of cerium and hafnium, said mixture containing 0.01–100 parts by weight of said aluminum halide per part by weight of said metal.

18. A catalyst of claim 17, in which said reaction is effected by grinding the reactants.

19. A catalyst of claim 17, in which said reaction is effected by heating an intimate mixture of said reactants.

20. A polymerization catalyst of claim 17, in which unreacted aluminum halide has been separated from said aluminum halide-metal reaction product.

21. A polymerization catalyst of claim 17, in which said halide is aluminum chloride, and said mixture contains 0.33–3 parts by weight of said aluminum chloride per part by weight of said metal.

22. A polymerization catalyst of claim 21, in which said metal is cerium.

23. A polymerization catalyst of claim 21, in which said metal is hafnium.

References Cited in the file of this patent

UNITED STATES PATENTS

| | | |
|---|---|---|
| 2,355,339 | Story | Aug. 8, 1944 |
| 2,827,446 | Breslow | Mar. 18, 1958 |
| 2,840,551 | Field et al. | June 24, 1958 |
| 2,884,409 | Bo et al. | Apr. 28, 1959 |
| 2,891,043 | Matlack | June 16, 1959 |
| 2,905,645 | Anderson et al. | Sept. 22, 1959 |

FOREIGN PATENTS

| | | |
|---|---|---|
| 538,782 | Belgium | Dec. 6, 1955 |
| 1,132,506 | France | Nov. 5, 1956 |
| 1,007,999 | Germany | May 9, 1957 |